United States Patent [19]

Bachelder et al.

[11] 4,172,003

[45] Oct. 23, 1979

[54] SLIDE CUTTING AND MOUNTING APPARATUS

[75] Inventors: Albert J. Bachelder, Lexington, Mass.; John W. Lothrop, Windham, N.H.

[73] Assignee: Polaroid Corporation, Cambridge, Mass.

[21] Appl. No.: 935,705

[22] Filed: Aug. 21, 1978

[51] Int. Cl.[2] .............................................. B32B 31/00

[52] U.S. Cl. .................................................... 156/517

[58] Field of Search ............... 156/513, 514, 517, 518, 156/530, 108

[56] References Cited

U.S. PATENT DOCUMENTS

| | | | |
|---|---|---|---|
| 3,085,618 | 4/1963 | Brundage | 156/530 |
| 3,163,570 | 12/1964 | Brundage | 156/108 |
| 3,992,243 | 11/1976 | Berggren | 156/108 |

FOREIGN PATENT DOCUMENTS

| | | | |
|---|---|---|---|
| 1382895 | 2/1975 | United Kingdom | 156/514 |

*Primary Examiner*—Douglas J. Drummond
*Attorney, Agent, or Firm*—Alfred E. Corrigan

[57] ABSTRACT

Apparatus for cutting a portion of a visible image from a film unit and mounting the same in a frame or slide holder of the type adapted to be received by a slide projector. The apparatus includes a female die upon which the film unit is supported and an elongate member having one end pivotally connected to a fixed support and its opposite end constructed to pivotally receive a male die thereby enabling the male die to self-align itself within the female die as the elongate member is rotated about its pivotal connection to the fixed support during the cutting or severing operation. A manually operative film advancing apparatus is provided for engaging an edge of the severed portion of the film unit and moving it into a chamber containing a plurality of open-ended slide mounts. As the severed portion is advanced into the chamber, its leading edge enters one of the mounts via its open end. The advancement of the severed portion is continued until it is fully seated or secured within the mount at which time the film advancing apparatus engages the mount and advances it to a position wherein it may be grasped and removed from the chamber.

6 Claims, 5 Drawing Figures

FIG. 4
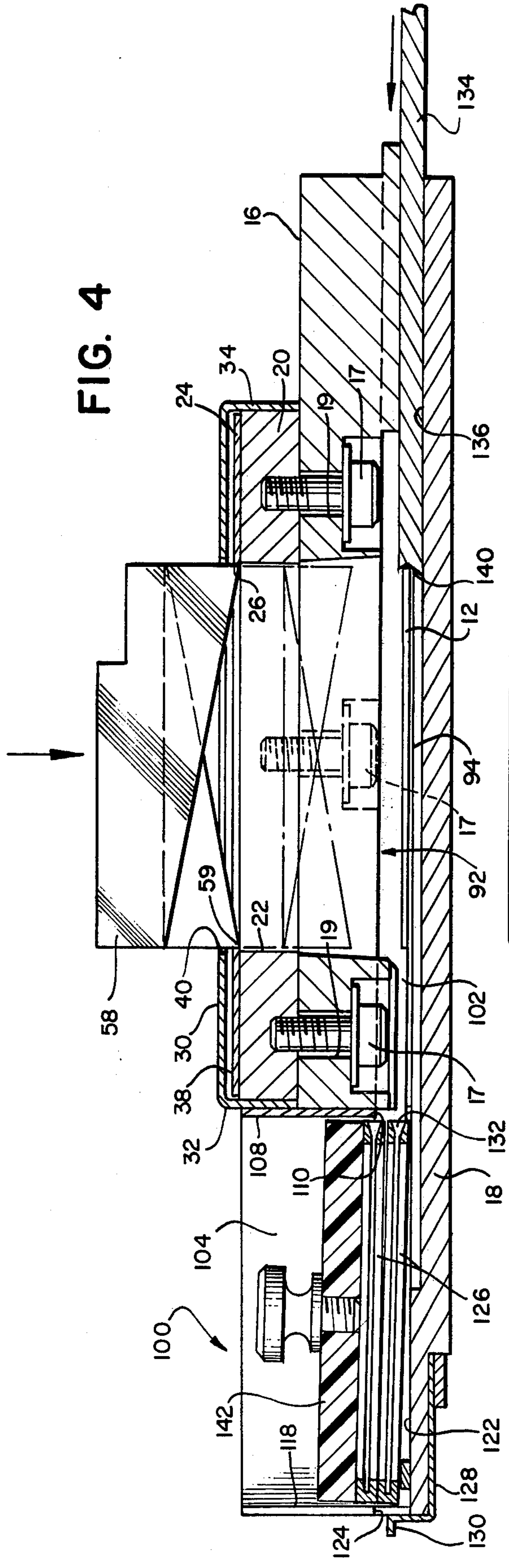
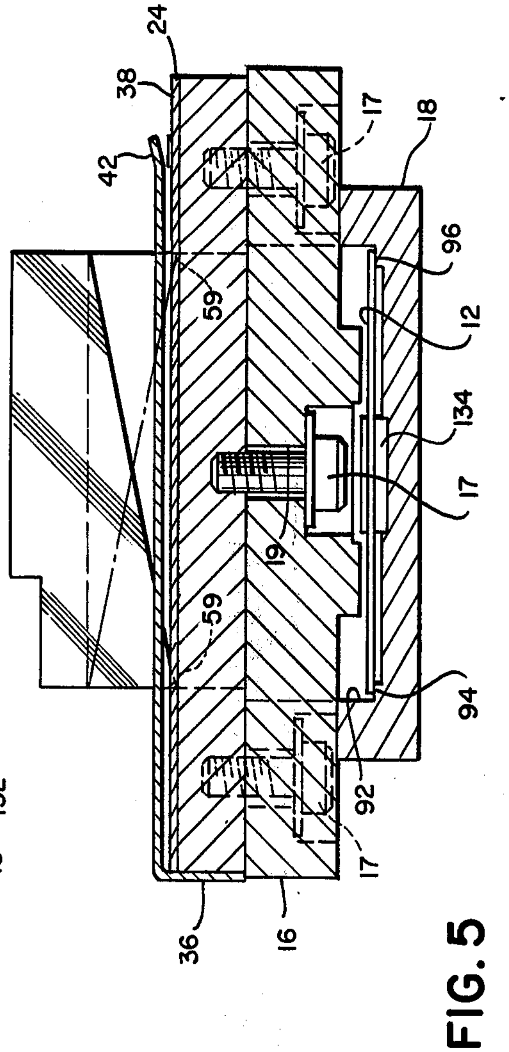
FIG. 5

SLIDE CUTTING AND MOUNTING APPARATUS

BACKGROUND OF THE INVENTION

1. Field of the Invention

This invention relates to apparatus for severing a portion of a visible image from a film unit and mounting the same in a holder of the type adapted to be received by a slide projector.

2. Description of the Prior Art

Generally, when a photographer wants his transparency prints mounted in frames suitable for use in a projector he must send them to a commercial establishment where they are put on an assembly line similar to that shown in British Pat. No. 1,382,895. There, sections of the film are severed, placed in frames or holders which are then sealed and moved to a bin from which they are taken and matched with the customer's order form for subsequent mailing to the customer. If the customer wants his reflective prints and his transparency prints cropped and mounted within similar frames he must make a special order with its attendant increase in cost. Hopefully, the prints will be cropped as requested and returned to the customer within a reasonable time.

Alternatively, the photographer may buy his own frames and do the cropping and mounting himself with an apparatus similar to that shown in U.S. Pat. No. 3,085,618. In this apparatus a section of a film strip is aligned with an aperture in a male die and a card having an aperture therein is located in alignment with the section of film to be severed. A lever is then depressed which, in turn, drives the male die forward first severing the film strip in two places and then advancing the severed portion into contact with an adhesive sheet which extends over at least a portion of the aperture in the card. One must then remove the card from the apparatus and trim it to a size which is compatible with a slide tray or a projector. Even then the resulting product suffers in comparison to that received from the commercial establishment. For example, since the severed section is in effect laminated onto the sheet, it can readily be seen that if the adhesive bond therebetween subsequently fails along an edge thereof, this edge may be hung up as the card is being moved into and/or out of its exposure position within the projector. Further, since the adhesive sheet extends over at least a portion of the aperture in the card there will be a problem in projecting that portion of the image in the severed section which is in engagement with the adhesive sheet.

From the foregoing, it can be seen that there is a need for a compact, inexpensive, manually operative slide cutting and mounting apparatus having means for cropping a larger image.

SUMMARY OF THE INVENTION

The instant invention relates to apparatus for severing a section of an image from a film unit and mounting the same in a slide holder for subsequent viewing in a projector. More specifically, the apparatus includes a base upon which a female die is supported. Mounted above the female die is a stripper plate having an aperture therein corresponding in size to the opening in the female die. The stripper plate functions to (1) remove the film unit from the male die after it has severed a portion of the film unit and (2) position a film unit relative to the opening in the female die. A pair of spaced arms extend upwardly from the base for pivotally supporting one end of an elongate member. The opposite end of the elongate member has a pin for pivotally supporting a male die and a spring for resiliently urging the male die into a predetermined position relative to the opening in the female die. The severing operation is accomplished by rotating the elongate member about its pivotal connection to the spaced arms from a first position wherein the male die is located in spaced relation to the female die to a second position wherein at least a portion of the male die is located within the female die. Although this movement may be accomplished by manually grasping the cantilevered end of the elongate member and applying a downward force thereto, it is preferred to pivotally connect a hand operable lever to the elongate member and to the base in a manner which increases the mechanical advantage of the elongate member.

The base is provided with a first chamber located immediately below the female die for receiving the severed portion of the film unit. A manually operative film pusher is located to one side of the first chamber with one end of the pusher located in position to engage the severed portion by its trailing edge and move the severed portion, leading edge first, into a second chamber. The second chamber is adapted to receive a stack of open ended slide mounts of the type adapted to be received by a slide tray or projector. The open end of the lowermost mount in the stack is located in alignment with an elongate slot or passageway which connects the first and second chambers. On the side of the second chamber opposite the passageway is an exit slot through which the lowermost mount is adapted to be moved to the exterior of the apparatus by the film pusher. A resilient member is mounted on the base such that a portion thereof extends across the exit slot to prevent movement of the lowermost mount therethrough until a predetermined force is applied to the mount. In operation, a film unit containing a visible image is slid between the stripper plate and the female die until a portion of the visible image is located in alignment with the opening in the female die. The hand operated lever is then actuated to move the elongate member from its first position to its second position thereby severing the section of the film unit which then falls into the first chamber. The lever is again actuated to return the elongate member to its first position thereby allowing the stripper plate to remove or strip the cropped portion of the film unit from the periphery of the male die. Next, the film pusher is actuated to move its end into engagement with the trailing edge of the severed portion of the film unit. Continued advancement of the film pusher moves the severed portion, leading edge first, through the passageway connecting the two chambers and into the lowermost mount in the second chamber until it is fully seated or secured therein. At this time, the end of the film pusher engages the mount and further advancement of the film pusher results in the mount overcoming the force of the resilient member extending across the exit slot and then moving, at least part way, through the exit slot to the exterior of the apparatus.

An object of the invention is to provide an apparatus for severing a preselected portion of a visible image from a film unit and mounting the severed portion in a holder of the type adapted for use with a projector.

Another object of the invention is to provide an apparatus of the type described with a male die which is self-centering as it enters a hole in a female die.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 4 is an enlarged cross sectional view of the lower portion of the apparatus taken substantially along the line 4—4 in FIG. 2; and FIG. 5 is an enlarged cross sectional view taken substantially along the line 5—5 in FIG. 2.

DETAILED DESCRIPTION OF THE INVENTION

Figure 1:
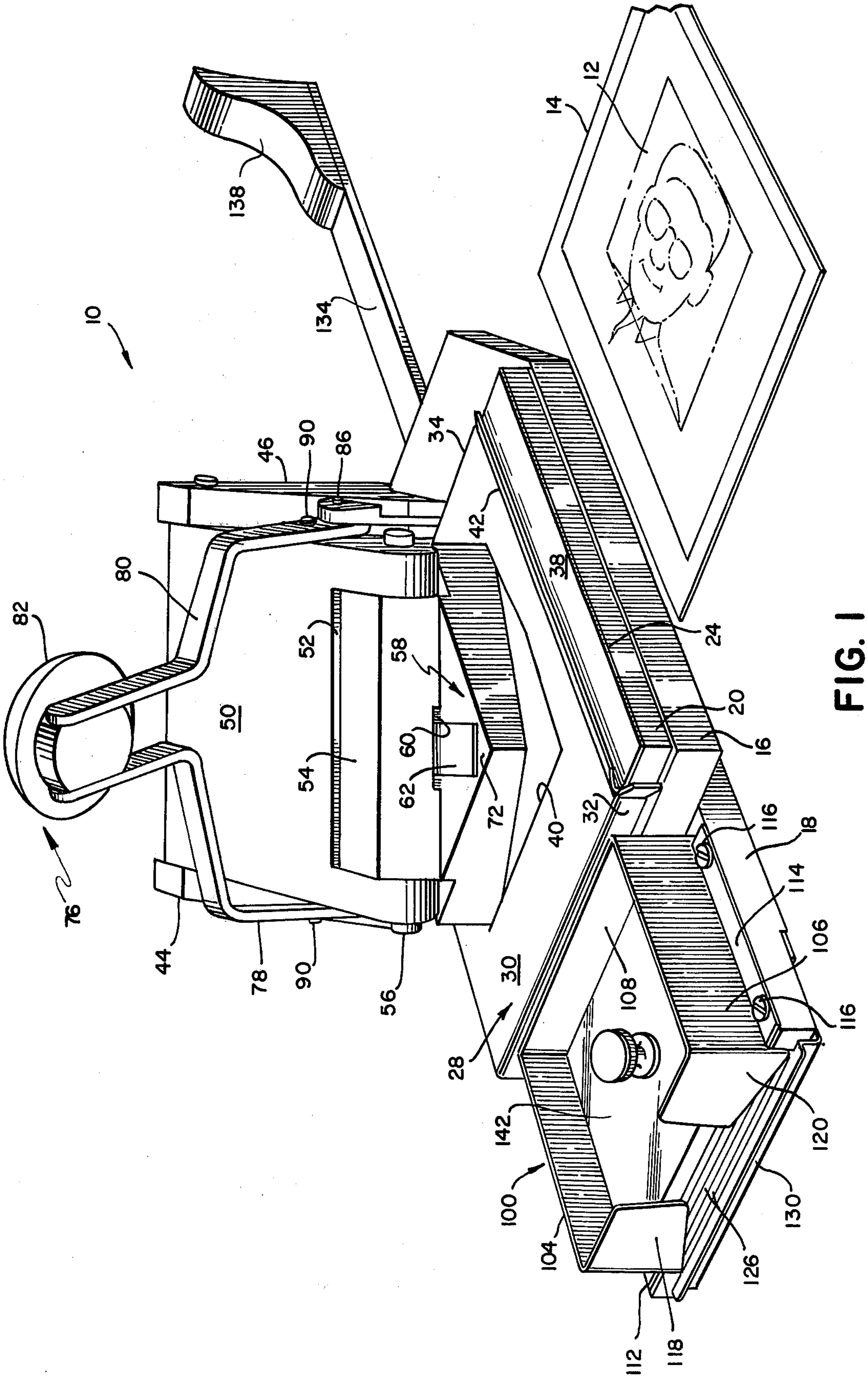
FIG. 1 is a perspective view of the apparatus of the instant invention.

Reference is now made to FIG. 1 wherein is shown an apparatus 10 for severing a portion 12 of a visible image from a film unit 14. The apparatus 10 includes a base 16 having a longitudinally extending portion 18 for supporting the apparatus 10 on a table or work bench. A female die supporting block 20 having a rectangularly shaped opening 22 extending therethrough is adjustably attached to the base 16 by a plurality of bolts 17 and to a female die 24 having a slightly smaller shaped rectangular opening 26 therein. The female die 24 is preferably punched from a thin sheet of spring tempered steel which materially reduces its cost. It should be noted that the openings 19 in the base 16 are larger than the diameter of the bolts 17 thereby enabling the block 20 and the attached female die 24 to be adjusted relative to the male die. Mounted above the female die 24 is a stripper plate 28. The plate 28 includes a central portion 30 from which depend three flanges 32, 34 and 36 for frictionally securing the plate 28 to the corresponding sides of the block 20. When secured in place, the lower edges of the flanges 32, 34 and 36 rest on the base 16 so as to locate the central portion 30 in spaced relation to the upper surface 38 of the female die 24 and to properly locate the portion 12 of the film unit in alignment with the opening 26 in the female die 24. The central portion 30 has a rectangularly shaped opening 40 therein which substantially corresponds to the dimensions of the opening 26 in the female die 24. A leading end 42 of the central portion 30 is upwardly turned and set back from the corresponding end of the female die 24 to facilitate the introduction of the film unit 14 between plate 28 and the surface 38 of the female die 24.

Figure 2:
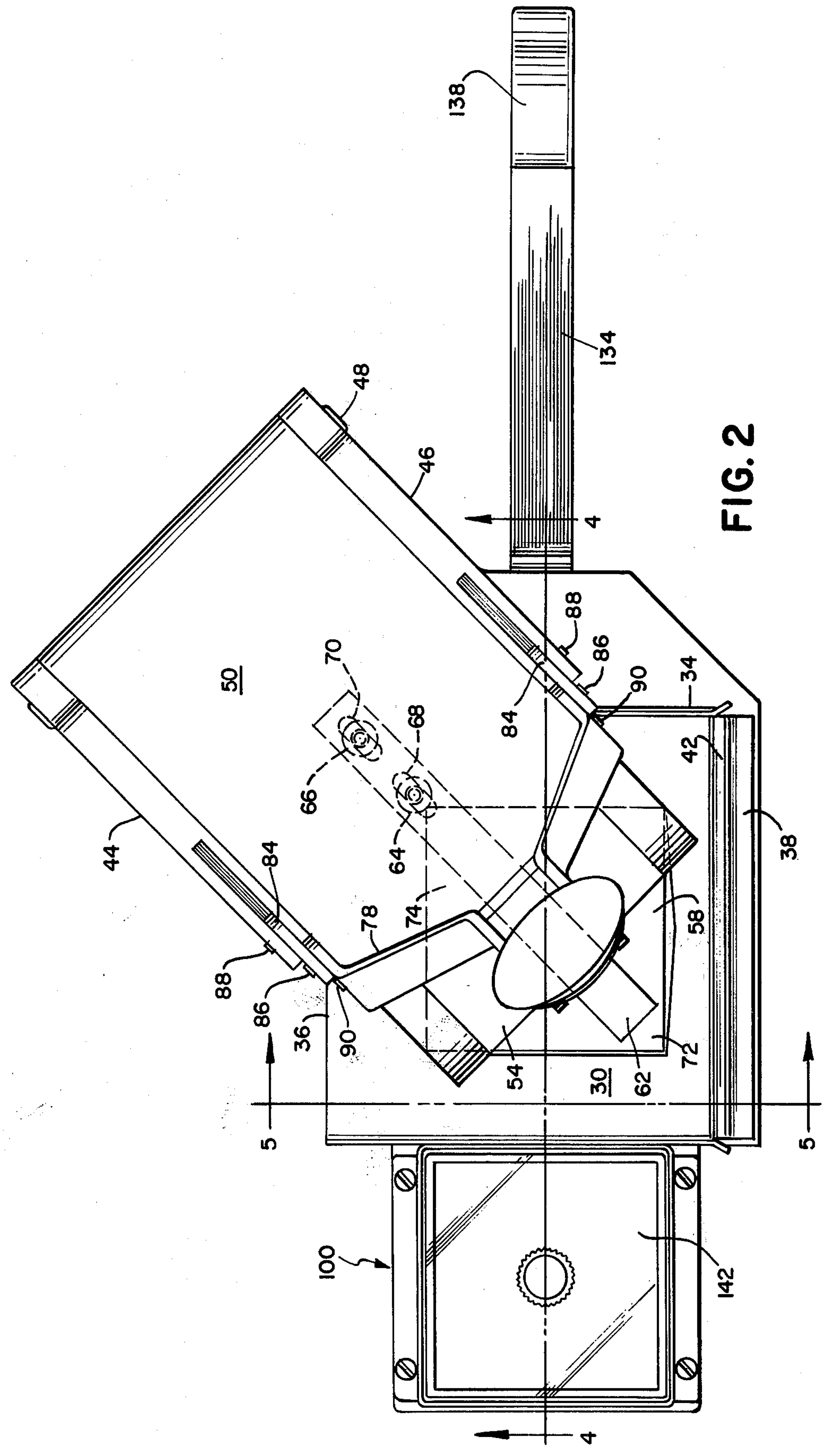
FIG. 2 is a top elevational view of the apparatus of FIG. 1.
Figure 3:
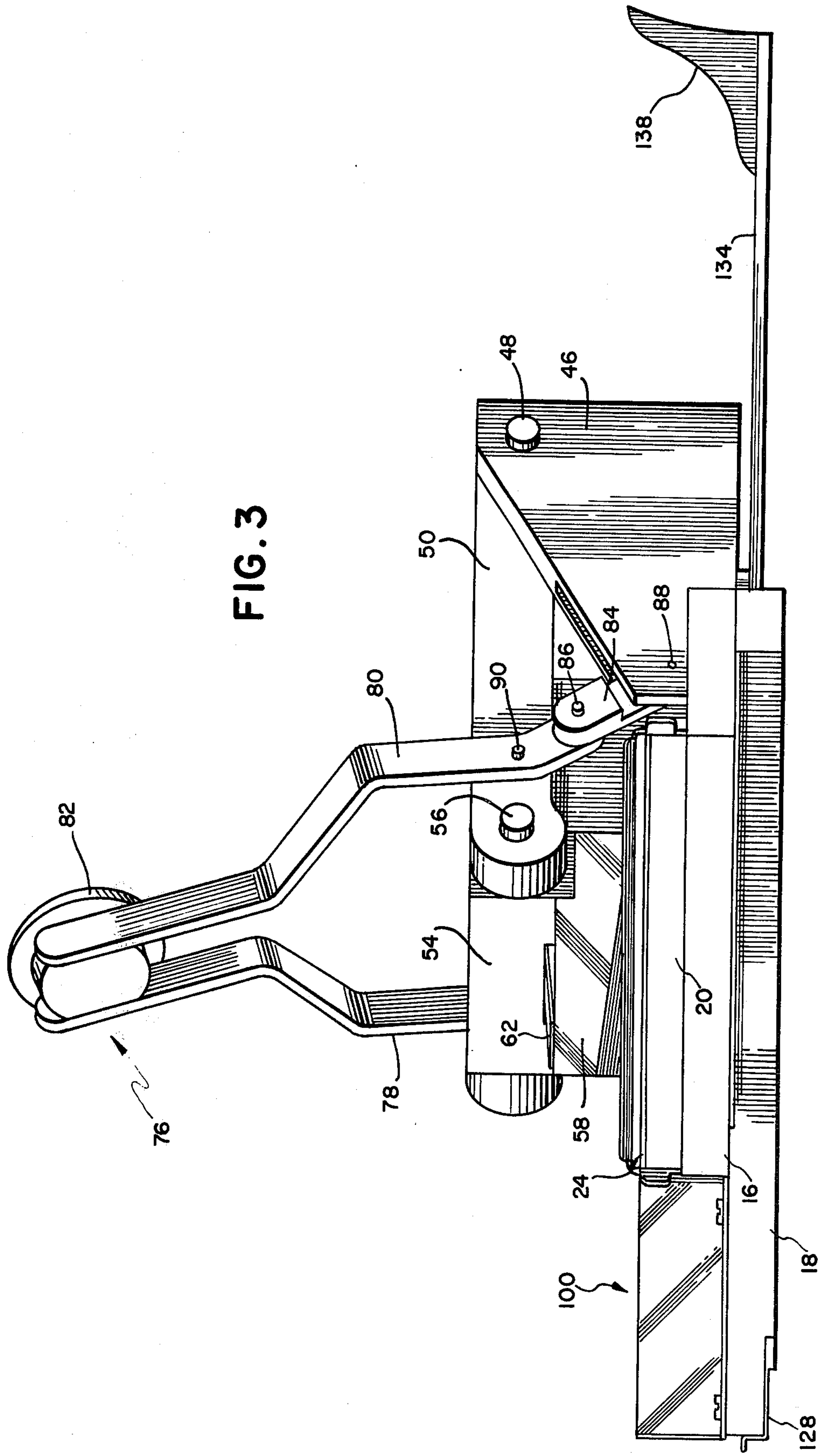
FIG. 3 is a side elevational view of the apparatus of FIG. 1.

A pair of spaced flanges 44 and 46 extend upwardly from the base 16 for pivotally supporting therebetween by means of a pin 48 one end of an elongate member 50. The opposite end of the elongate member 50 includes a recessed portion 52 for receiving an elongate block 54. The block 54 is pivotally connected to the end of the elongate member 50 by a pin 56. A rectangularly shaped male die 58 is fixedly secured to the block 54. The bottom or lower surface of the block 54 is cut away to form a recess 60 which is adapted to slidably receive a strip of spring steel 62. As best seen in FIG. 2, the strip 62 is adjustably secured to the bottom surface of the elongate member 50 by a pair of screws 64 and 66 which extend through a pair of elongate slots 68 and 70 in the strip 62. The opposite end of the strip 62 is bent downwardly such that its tip is in engagement with a corner 72 of the male die 58 thereby resiliently biasing the opposite corner 74 of the male die 58 into engagement with the strip 62. The strip 62 thus insures that the male die 58 will return to its original position relative to the opening 26 in the female die 24 when the elongate member 50 is returned to its first position at the end of the severing step. Stated another way, the cutting surfaces of the male die 58 meet at opposite lower corners 59. These corners 59 move through an arc as the elongate member 50 is rotated about its pivot 48. As each corner 59 enters the corresponding corner of the female die 24, the two dies are in alignment with each other. As the corners 59 move deeper into the opening 26 in the female die 24, they also have a tendency to move laterally to the right because they are traveling along the arc whose center is 48, rather than traveling along a vertical line. However, as the corners 59 start to move to the right they engage the adjacent right hand surfaces of the opening 26 in the female die thereby causing the male die 58 to rotate in a clockwise direction about its pivotal connection 56 thereby self centering the male die 58. When the elongate member 50 is returned to its original or first position, the spring or strip 62 returns the male die 58 to its original position.

While severing of the section 12 from the film unit 14 may be accomplished by depressing the elongate member 50, it is preferred to provide the apparatus with a hand-operable lever 76 for increasing the mechanical advantage of the elongate member 50. The lever 76 includes a pair of arms 78 and 80 attached to each other at their upper ends by a handle 82. The lower end of each of the arms 78 and 80 is pivotally connected to one of the flanges 44 and 46 by a link 84 and pins 86 and 88. An intermediate portion of each of the arms 78 and 80 is pivotally coupled to the elongate member 50 by a pin 90.

As can best be seen in FIGS. 4 and 5, the longitudinally extending portion 18 of the base 16 is recessed to provide a first chamber 92 for receiving the severed portion 12 of the film unit 14. The chamber 92 is provided with a pair of laterally spaced, longitudinally extending rails 94 and 96 which are adapted to support the lateral sides of the severed portion 12 such that the latter will not be scratched by the bottom wall 98 of the chamber 92 during movement of the severed portion 12 out of the chamber 92.

A second chamber 100 is mounted adjacent to one end of the first chamber 92 and is connected thereto by a passageway 102 having a width sufficient to permit the movement of the severed portion 12 therethrough. The second chamber 100 includes a pair of side walls 104 and 106 interconnected by a rear wall 108 having an opening 110 therein. Each of the side walls 104 and 106 is provided with an outwardly extending flange 112 and 114, respectively, for securing the chamber 100 to the longitudinally extending portion 18 by suitable means such as screws 116. The ends 118 and 120 of the walls 104 and 106 are bent inwardly towards each other to define the front wall of the second chamber 100. The lowermost portion of each end 118 and 120 terminates short of the bottom wall 122, see FIG. 4, of the second chamber 100 so as to define an exit opening 124 through which only one mount 126 may pass at a time. A resilient member 128, which is suitably secured to the underside of the longitudinally extending portion 18, includes an upwardly turned end section 130 which extends across the width of the exit opening 124. As best seen in FIG. 4, the end section 130 is located in the path of travel of the lowermost mount 126 through the exit opening 124 thereby preventing movement of the mount 126 therethrough until the end section 130 has been deflected into a non-interferring position.

The apparatus 10 includes manually operative means for engaging a trailing edge of the severed portion 12 of the film unit 14 and advancing it leading edge first through the passageway 102 and through an open end 132 in the lowermost frame 126 located in the second chamber 100 until the severed portion 12 is fully located and seated within the frame 126. Specifically, the above means comprises a generally thin flat longitudinally extending member 134 which is mounted for reciprocal movement within a slot 136 in the member 18. The member 134 has a handle 138 secured at one end thereof and is provided with a recessed portion 140 at its opposite end which is adapted to receive the trailing edge of the severed portion 12 of the film unit 14. After the severed portion 12 drops into the first chamber 92, the handle 138 is manually grasped and moved to the left, as viewed in FIG. 4, thereby moving the recessed end portion 140 into engagement with the trailing edge of the severed portion 12. The severed portion is advanced, leading end first, through the passageway 102, the opening 110 in the rear wall 108 of the second chamber 100, and into the lowermost mount 126 via its open end 132. This advancement of the severed portion 12 is continued until it is fully located and frictionally retained within the lowermost mount 126. At this time, the recessed end portion 140 moves into engagement with the right hand side of the mount 126 and continued advancement of the member 134 results in the left hand side of the mount 126 deflecting the end portion 130 of the resilient member 128 into a non-interferring position thereby enabling the lowermost mount 126 to pass at least part way through the exit slot 124 where it may be grasped and fully removed from the second chamber 100. After the lowermost mount 126 has been removed from the chamber 100, a weight 142 located on top of the stack of mounts assists in moving the next lowermost mount 126 into position to receive the next severed portion.

As mentioned hereinabove, the flanges 32, 34 and 36 of the stripper plate 28 function to position the film unit 14 such that the central area of the visible image is located in alignment with the opening 26 in the female die 24. However, if the user of the apparatus 10 desires to sever a section of the film unit 14 other than the portion 12 he need but remove the stripper plate 28 and the pin 90. The elongate member 50 and the attached male die 58 may then be rotated in a clockwise manner through the legs 78 and 80 into a position wherein the film unit may be placed on the surface 38 of the female die and moved about until the desired portion is located in position to be severed. If need be, the bottom of the chamber 92 may be provided with a light source for back lighting the film unit 14 when it takes the form of a transparency.

Since certain changes may be made in the above apparatus without departing from the scope of the invention herein involved, it is intended that all matters contained in the above description or shown in the accompanying drawings shall be interpreted as illustrative and not in a limiting sense.

What is claimed is:

1. Apparatus for cutting a portion of a visible image from a film unit and mounting the same in a frame of the type adapted to be received by a slide projector, said apparatus comprising:

means including a female die for supporting a film unit having a visible image therein in position to have a portion of the visible image severed therefrom;

a male die;

support means;

an elongate member having said male die coupled near one end thereof and its opposite end pivotally coupled to said support means for movement of said elongate member from a first position wherein said male die is located in spaced relation to said female die to a second position wherein at least a portion of said male die is located within said female die;

means for pivotally coupling said male die to said one end of said elongate member whereby said male die aligns itself within said female die as said male die moves from said first to said second position to sever the portion of the film unit;

means for defining a first chamber for receiving the severed portion of the film unit;

means for defining a second chamber for housing at least one frame;

means for defining a passageway between said first and second chambers; and manually operative means for engaging a trailing edge of the severed portion of the film unit located within said first chamber and advancing it leading edge first through said passageway and through an open end in the frame located in said second chamber until the severed portion is fully located within the frame.

2. Apparatus as defined in claim 1 further including means for defining an exit slot in a wall of said second chamber through which a frame and its associated severed portion of the film unit are adapted to be advanced to the exterior of said apparatus and resilient means mounted in blocking relation to said exit slot for preventing movement of the frame and its severed portion of the film unit through said exit slot until the severed portion is fully seated within the frame at which time said manually operative means engages the frame with sufficient force to enable it to move said resilient means out of blocking relation with said exit slot as the frame is advanced therethrough by said manually operative means.

3. Apparatus as defined in claim 1 wherein said first chamber includes a bottom wall and means for supporting the severed portion of the film unit along only its lateral edges thereby preventing said bottom wall from scratching the severed portion of the film unit during its movement from said first chamber to said second chamber.

4. Apparatus as defined in claim 1 further including means for resiliently biasing said male die into a predetermined position relative to the opening in said female die when said elongate member is in said first position.

5. Apparatus as defined in claim 1 further including means mounted between said female and male dies for positioning the film unit relative to the opening in said female die and for stripping the remainder of the film unit from the male die after the portion has been severed from the film unit.

6. Apparatus as defined in claim 1 further including a hand-operable lever having one end pivotally coupled to said support means, a handle at its opposite end, and an intermediate portion thereof pivotally coupled to said elongate member at a location between its pivotal coupling to said support member and said male die thereby increasing the mechanical advantage of said elongate member as it is moved from said first position to said second position by actuation of said lever.

* * * * *